United States Patent [19]

Duncan

[11] 3,968,712
[45] July 13, 1976

[54] FABRICATED TABLE FOR STATIONARY POWER TOOLS

[75] Inventor: John L. Duncan, Pickens, S.C.

[73] Assignee: The Singer Company, New York, N.Y.

[22] Filed: May 1, 1975

[21] Appl. No.: 573,657

[52] U.S. Cl. .............................. 83/477.2; 29/445; 108/143; 108/159
[51] Int. Cl.² .................... B23D 19/00; B26D 1/18; B27B 5/28; B27B 27/04
[58] Field of Search ................. 29/445 X; 83/477.2; 108/90, 143 X, 159 X

[56] References Cited
UNITED STATES PATENTS

| | | | |
|---|---|---|---|
| 318,260 | 5/1885 | Keller | 83/477.2 |
| 420,739 | 2/1890 | Schmitz | 83/477.2 X |
| 1,801,721 | 4/1931 | Caldwell | 83/477.2 |
| 2,615,479 | 10/1952 | Bearup | 83/477.2 X |
| 3,071,889 | 1/1963 | Silver | 83/477.2 X |
| 3,269,433 | 8/1966 | Packard et al. | 83/477.2 |
| 3,919,949 | 11/1975 | Rendleman | 108/143 X |

*Primary Examiner*—Charlie T. Moon
*Attorney, Agent, or Firm*—Robert E. Smith; Edward L. Bell; Harold Weinstein

[57] ABSTRACT

A method and article of fabricating a table comprising the steps of making a lightweight metal frame having a plurality of channels, the edges of which are slightly overlapped by steel plates placed on and connected to the frame. The top surface of the steel plates is machined to render the same coplanar.

The frame has orthogonal ribs, and a plurality of bosses formed with apertures therethrough for passage of connecting screws which thread into tapped holes formed in the steel plates. Any excessive length of the screws will be cut off during the machining operation.

5 Claims, 3 Drawing Figures

U.S. Patent  July 13, 1976  3,968,712

FABRICATED TABLE FOR STATIONARY POWER TOOLS

BACKGROUND OF THE INVENTION

Prior art tables for stationary power tools were made of cast iron which could be formed in a single casting operation to provide a top working surface of uniform flatness and a material composition which provides a rigid durable work surface. Until the present invention, other tables were noncompetitive with the cast iron table be it for reasons of economy, stability, or wear characteristics.

SUMMARY OF THE INVENTION

It is therefore an object of the present invention to provide an improved method and article of fabricating a table for power tools which overcomes the prior art disadvantages; which is not made of cast iron; which is simple, economical and reliable; which is fabricated of two materials suitably connected, wherein the first material is lightweight and makes up the frame upon which the second material which is heavier and has better wear characteristics, is connected to the frame prior to milling of the top surface thereof to form a coplanar top surface thereon; which uses a lightweight metal frame; which uses steel plates connected to the frame; which has integrally formed channels in the frame, the upper surface of which is formed by steel plates; which uses threaded screws to connect the frame to the steel plate; which uses connecting screws of excessive length which are cut off by the machining operation to place them coplanar with the top surface of the steel plates; and which uses a substantially hollow frame made of lightweight metal having orthogonal ribs formed therein intermediate the channels.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
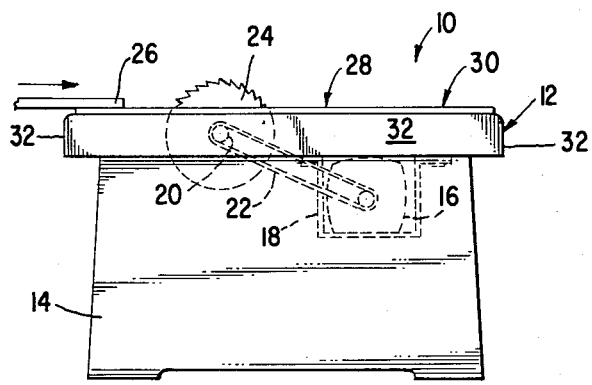
FIG. 1 is a side elevational view of a fabricated table for stationary power tools embodying the present invention.

In the illustrated embodiment of the invention, FIG. 1 shows a stationary power tool, such as a bench saw, designated generally as 10, which includes a frame 12 mounted atop a stand 14. A motor 16 is mounted upon a bracket 18 which in turn is affixed to the underside of the frame 12. An arbor 20 is journaled in the frame 12 to be rotated by a belt 22 which is driven by the motor 16. A saw blade 24 is detachably connected to the arbor 20 and will be rotated therewith, so that translation of a workpiece 26 into engagement with the saw blade 24 will result in cutting of the workpiece 26. The workpiece 26 will be translated across the work surface 28 composed of a plurality of steel plates 30 the upper surfaces of which will lie in coplanar relationship to each other, as described more fully hereinafter. The bench saw 10 may include suitable mechanisms (not shown) such as a height and a tilt adjustment of the type conventionally used in bench saws.

The frame 12 may be formed of any suitable lightweight material, such as a metal die cast of aluminum or aluminum alloy having the desirable characteristics of its being malleable, ductile, lightweight and resistant to oxidation. Of course, the frame 12 could be made from any other suitable material whether for example metal or nonmetal, such as magnesium or magnesium alloy. The frame 12 would not be made solely of lightweight material since it would have unfavorable wear and weight characteristics. Therefore, the steel plates 30 are used in combination with the frame 12, to add the necessary weight, stability and long life characteristics to the frame.

Figure 2:
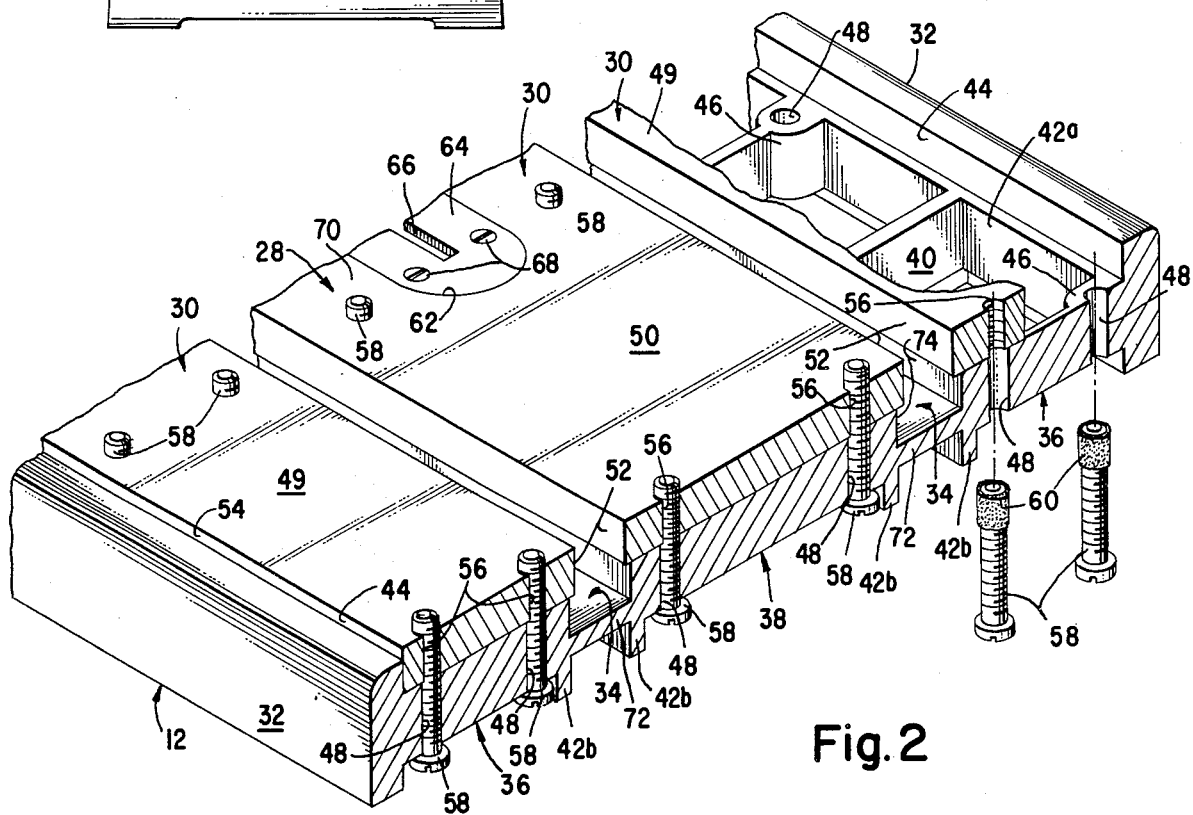
FIG. 2 is an enlarged fragmented partially exploded and sectional view showing the fabricated table of the present invention.
Figure 3:
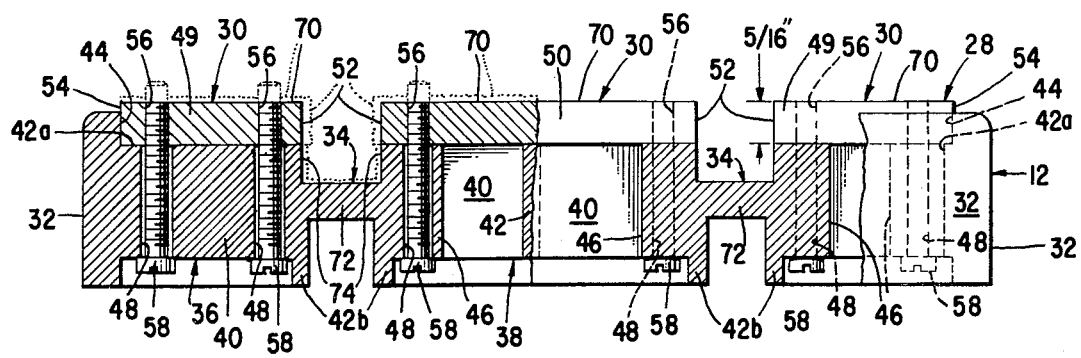
FIG. 3 is a front elevational view, partly in section, showing the fabricated table embodying the present invention.

The aluminum frame 12 illustrated in FIGS. 2 and 3 has four peripheral side walls 32, which form a parallelogram and overhang from the stand 14. The pair of spaced-apart, parallel guide channels 34 extend longitudinally in the frame 12 to divide the upper portion thereof into two substantially equal side sections 36, 36 and a central section 38; each of the sections 36, 36 and 38 is substantially open with the frame being interconnected by a series of transverse ribs integrally joined by longitudinal ribs 42, as illustrated in FIGS. 2 and 3. The longitudinal ribs formed integrally with the side wall 32, are designated as longitudinal ledge ribs 42a, while the longitudinal ribs which border in channel 34 are designated channel ribs 42b. The ribs 40 and 42 are joined together to form a lattice-like grid which defines an orthogonal shape having an upper surface which lies in a common plane. The sides 32 extend above the top of the ribs to define an internally extending shoulder 44 which borders the inner periphery of the frame 12. Bosses 46 are formed in the frame 12, integrally with one of the ribs 40 or 42 spaced from each other in the rib grid network and each boss 46 has a clearance hole 48 extending vertically therethrough. The bosses 46 border the side walls 32 and the guide channel 34 as shown in FIGS. 2 and 3.

Each of the steel plates 30 is substantially rectangularly shaped, and includes two sides plates 49, 49 and a central plate 50. The size of the steel plates 30 are such that the side plates 49, 49 and the central plate 50 have the edge 52 of each, which lies adjacent the guide channel 34, slightly overlapping into the guide channel as best seen in FIG. 2, and shown in the dotted line representation of FIG. 3. The steel plates 30 will completely cover the frame section 36, 36 and 38, while leaving the channel 34 open except for the slight overlapping previously mentioned. The longitudinal edge 54 of the side plates 49, 49 will abut the shoulder 44 of the side wall 32. A plurality of tapped holes 56 are formed in the steel plate 30 in alignment with the clearance hole 48, wherein a plurality of screws 58 pass from the underside of the frame 12 through the holes 48 to come into threaded engagement in the holes 56 to connect the steel plate 30 to the frame 12, as illustrated in FIGS. 2 and 3. To provide a permanent assembly, the screws 58 are coated with a thread locking compound 60 at the end thereof, which comes into locking engagement with the threads of the tapped holes 56. The screws 58 have an excess of length so as to extend above the upper surface of the steel plate when the heads of the screws 58 contact the underside of the frame 12, as is shown in FIG. 2, and in the dotted line representation of FIG. 3. This is the assembled position in which the screws 58 act to lock the steel plates 30 upon the frame 12.

The central steel plate 50 has a saw blade cutout 62 shown in FIG. 2 which is enclosed by a removable plate 64 having a blade slot 66 of predetermined width therein to correspond to the saw blade 24. Screws 68 affix the plate 64 in position and are threadedly received in tapped holes (not shown) formed in the frame 12. The saw blade 24 will extend vertically through the blade slot 66, as is shown in FIG. 1.

The steel plates 30 are taken from stock and have a thickness slightly greater than 5/16 inch so as to have a final thickness of 5/16 inch as depicted in FIG. 3. The manufactured tolerance for a 5/16 inch thick plate from stock may be ±.060 inch, at the top surface 70 and the sheared edges 52. The steel plates 30 are sized to fit and connected to the frame 12 with the top surface 70 thereof unfinished, and the sheared edges 52 also unfinished, which is how the plates 30 are shown in FIG. 2, and the dotted line representation thereof in FIG. 3. Because of the sectional nature and the manufactured tolerance of the steel plates 30, it would not provide the desired work surface 28 necessary for the bench saw 10 on an "as is" basis. Accordingly, the work surface 28 is machined to finish the top surface 70 of the steel plates 30 to remove the manufactured tolerance and to place each of the top surfaces 70 of the steel plates 30 in a coplanar relationship to each other. In this manner the top surface 70 which defines the work surface 28 is rendered exactly perpendicular to the plane in which the saw blade 24 normally lies.

The channel 34 has a bottom wall 72 which bridges between the side walls 74, with the bottom and side walls 72 and 74 being cast a few thousandths of an inch excess of the desired final dimension to permit machining thereof down to the final dimension. In unfinished form as shown in FIG. 2 and the dotted line representation of FIG. 3, the edges 52 of the steel plates 30 extend over the side walls 74 of aluminum casting. However upon machining the channel 34 a single straight vertical wall is formed combining the edge 52 and the wall 74. During the machining operation, the bottom wall 72 is also machined so as to render it perpendicular to the side wall 74. This is best seen in FIG. 3 wherein the excess amounts are shown in the dotted line representation about the channel 34, while the solid line figure of the channel 34 shows the finished or machined steel plate 30 and frame 12. The machining may be by milling or any other suitable operation to remove the excess material and to render the top surfaces 70 coplanar, while shaving the edges 52 and side walls 74 to form a uniform combined vertical wall therebetween and removing any excess material from the bottom wall 72 to make the same perpendicular to said vertical wall 74.

The machining operation of the steel plates 30 will also serve to remove any excess in length of the screws 58 as is indicated by the dotted line representation of FIG. 3, whereby in the finished top surface, the screws 58 will lie coplanar to the top surface 70. In this manner, the flatness of the steel plate 30 is compatible to the one piece cast iron table top used for bench saws or other stationary power tools. The present invention enables the fabrication of a table which has similar or improved dimensional stability of that of the cast iron tables, but is produced at a competitive or a lower cost.

After the steel plates 30 have been placed upon the frame 12, the screws 58 will connect the plate 30 to the frame 12 with the excess length thereof extending above the top surface. Assuming the machining operation is to be milling, upon the top surface 70 being milled each of the three sections of steel plate 30 will be rendered coplanar, while the excess of the screws 58 will be cut off at the milled surface. The milling operation in the channels 34 provide a straight sided wall for the channel 34 in which the upper surface thereof, which is subject to greater use and wear, is made of the harder and more durable steel plates 30. This permits and extends the life of the fabricated table to at least equal that of or make it greater than that of the prior art cast iron tables.

Once assembled, the steel plates 30 are permanently connected to the frame 12. If any of the steel plates are disassembled, the machining operation must be redone to insure the coplanar relationship between the top surfaces 70 of each of the steel plates 30.

It will be understood that various changes in the details, materials, arrangements of parts and operating conditions which have been described and illustrated in order to explain the nature of the invention, may be made by those skilled in the art within the principles and scope of the invention.

Having thus set forth the nature of the invention, what is claimed herein is:

1. A fabricated table for a stationary power tool comprising:
   a. a frame made of a lightweight material,
   b. at least one channel formed in the top surface of the frame to divide the frame into sections,
   c. a plurality of bosses formed in the frame with apertures therethrough,
   d. a plurality of steel plates, one atop each frame section, and disposed on either side of the channel,
   e. a plurality of tapped holes formed in the steel plates in alignment with the apertures in the bosses, and
   f. threaded means extending through the apertures in the bosses to be threadedly received in the tapped holes of each of the steel plates to secure the steel plates to the frame, whereby the top surface of the steel plate to be machined to provide a coplanar surface thereon.

2. The combination claimed in claim 1 wherein:
   a. the edges of each of the steel plates adjacent the channel slightly overlaps the channel, and
   b. said edges to be machined to make them uniform with the side walls of the channel.

3. The combination claimed in claim 1 wherein:
   a. the threaded means define screws of an original length greater than the combined height of the frame boss and steel plate, whereby the screw will extend above the top surface of the frame so that the excess length of the screws will be removed during the machining of the top surface.

4. The combination claimed in claim 1 wherein:
   a. the frame sections between the channel are substantially open areas,
   b. rib members are formed integrally with the frame to extend in the open areas, and
   c. the bosses are formed at some of the rib members.

5. The combination claimed in claim 4 wherein:
   a. a motor is mounted to the frame,
   b. a blade slot for a saw blade is formed in one of the plates,
   c. a saw blade is rotatively carried on the frame to extend through and vertically above the blade slot, and
   d. means connecting the saw blade to the motor, whereby the saw blade is driven by the motor and is adapted to cut any work translated upon the table into engagement with the saw blade.

* * * * *